United States Patent [19]

Himsley

[11] 4,427,639

[45] Jan. 24, 1984

[54] ION EXCHANGE PROCESS

[75] Inventor: Alexander Himsley, Toronto, Canada

[73] Assignee: Himsley Engineering Limited, Toronto, Canada

[21] Appl. No.: 242,034

[22] Filed: Mar. 9, 1981

Related U.S. Application Data

[63] Continuation of Ser. No. 875,426, Feb. 6, 1978, abandoned.

[51] Int. Cl.³ .............................................. C01G 43/00
[52] U.S. Cl. ........................................... 423/7; 423/11
[58] Field of Search .............................. 423/6, 7, 11

[56] References Cited

U.S. PATENT DOCUMENTS

| | | | |
|---|---|---|---|
| 2,877,089 | 3/1959 | McLean | 423/7 |
| 3,971,842 | 7/1976 | Ewbank | 423/7 |
| 3,998,924 | 12/1976 | Jones et al. | 423/7 |
| 4,018,677 | 4/1977 | Himsley | 210/33 |
| 4,035,292 | 7/1977 | Himsley | 423/7 |
| 4,112,045 | 9/1978 | Seko et al. | 423/6 |

FOREIGN PATENT DOCUMENTS

| | | |
|---|---|---|
| 755601 | 8/1956 | United Kingdom . |
| 778061 | 7/1957 | United Kingdom ............ 423/7 |
| 808910 | 2/1959 | United Kingdom . |
| 1297078 | 11/1972 | United Kingdom . |

OTHER PUBLICATIONS

Himsley et al., "Operating and Design Details of a Truly Continuous Ion Exchange System", paper given at the Society of Chemical Industry Conference, Jul. 1976, Cambridge, England.

Vigvari et al., *J. of Chromatography*, 102, 433–6 (1974).

*Primary Examiner*—Edward A. Miller
*Attorney, Agent, or Firm*—Ridout & Maybee

[57] ABSTRACT

In an ion exchange process for recovering valuable components from a weak feed solution containing impurities, an improved loading of the desired component on the resin and a purer and more concentrated eluate can be obtained by subjecting the resin to a conditioning step after the step of exhaustion of the feed solution onto the resin and before the resin elution step. In the conditioning step, a predetermined isolated quantity of the loaded resin is contracted with a conditioning solution capable of preferentially removing the unwanted impurity component.

6 Claims, 13 Drawing Figures

ION EXCHANGE PROCESS

This application is a continuation of application Ser. No. 875,426, filed Feb. 6, 1978, abandoned.

BACKGROUND OF THE INVENTION

This invention relates to processes utilizing ion exchange resin for recovering a concentrated solution of uranium from a feed solution, relatively weak in uranium ion and containing ferric ion as an unwanted impurity component.

In the conventional recovery processes, the presence of unwanted ferric impurity in the feed solutions often detracts from the efficiency of the process, as, firstly, the unwanted ferric component if present in significant concentrations often tends to initially saturate the resin in the step of exhaustion of the feed solution onto the resin, even though the resin has less affinity for the unwanted component than for the component of interest, and either longer periods are required for achieving a loading of the component of interest approaching the equilibrium loading, or if a shorter period is allowed for the absorption step this is at the expense of achieving lower loadings of the component of interest.

Secondly, the unwanted ferric component tends to be stripped from the loaded resin in the elution step of stripping the loaded resin with eluant solution containing eluant ion, and the unwanted ferric component which is recovered along with the uranium in the concentrated eluate may be present in such concentrations that it renders the subsequent operation of separating the uranium from the concentrated eluate more costly than would be the case if a purer eluate could be recovered.

SUMMARY OF THE INVENTION

In one aspect of the present invention, there is provided a process for recovery of uranium in relatively concentrated form from a feed solution relatively weak in uranium ions and containing ferric ions as an unwanted component, comprising passing batches of anion exchange resin particles having preferential affinity for uranium complex anions successively along an absorption column; contacting said batches in the column with said feed solution and permitting uranium ions, together with ferric ions, to load onto the particles as complex anions and withdrawing from the absorption column a barren solution substantially exhausted of uranium ions and containing nonabsorbed ferric ions; removing uniform batches of the loaded particles from the absorption column; isolating each of said uniform batches of loaded resin particles removed from the absorption column in a conditioning chamber; conditioning each isolated batch by flowing through it at a controlled rate a conditioning solution that is rich in uranium ions and weak in ferric ions and is at a pH effective to increase the ratio between the uranium ions and the ferric ions loaded on the resin particles by causing ion exchange to occur between the conditioning solution and the resin whereby further uranium ions are loaded onto the resin and some of the ferric ions are removed from the resin and concomitantly withdrawing from the conditioning chamber a spent conditioning solution containing uranium ions and ferric ions; recycling the spent conditioning solution to said feed solution; moving the conditioned batches to an elution column and passing them successively along the elution column; contacting the conditioned batches in the column with sulphuric acid eluant solution that strips the uranium ion and ferric ion from the resin particles; recovering from the elution column a concentrated eluate that is a relatively concentrated uranium solution at acidic pH, and contains a relatively low concentration of ferric ions; subjecting the concentrated eluate to uranium-recovery treatment, and recovering a uranium-rich yellow cake therefrom; and wherein said conditioning solution is a liquid selected from the group consisting of a portion of the concentrated eluate recovered from the elution column that is modified by increasing its pH by addition of a base thereto, and a solution comprising a portion of said yellow cake dissolved in sulphuric acid.

In the above process, a predetermined quantity of the loaded resin can be contacted under controlled conditions with a predetermined quantity of the conditioning solution for a predetermined period until equilibrium is essentially complete between the conditioning solution and the resin, thus maximizing the removal of the unwanted ferric component. A maximized loading of the resin can be obtained which increases the purity of and concentration of the component of interest in the effluent of the elution step.

Subsequent to the conditioning treatment, the conditioning solution can be displaced from the resin by a solution having a high concentration of the component of interest such as concentrated eluate or any other such solution.

While the use of the above-mentioned conditioning solutions would be incompatible with efficient elution if contacted with the loaded resin in the course of the elution step, or could only with difficulty be generated by modification of the concentrated eluate within the confines of the elution column, these solutions can readily be used in the above-treatment without interfering with the subsequent elution step.

The treatment can be applied with particular advantage in an anion-exchange resin elution system wherein acidified sulphate is employed as the stripping eluant, the eluant ion being in this case $HSO_4^-$. A highly effective conditioning solution can then be obtained by changing the pH of the concentrated eluate solution by addition of a base, to achieve a solution having a pH which is found to optimise removal of the unwanted ferric component and replacement by a higher loading of the component of interest.

BRIEF DESCRIPTION OF THE DRAWINGS

An example of a recovery process embodying the above aspects of the invention will now be described with reference to the accompanying drawings wherein.

DESCRIPTION OF THE PREFERRED EMBODIMENTS

By way of example only, a process will be described for the recovery of a concentrated solution of uranium from an acid leach liquor relatively weak in uranium ion and containing ferric ion as unwanted impurity. In such case the component of interest is a complex ion containing uranium.

Figure 12A:
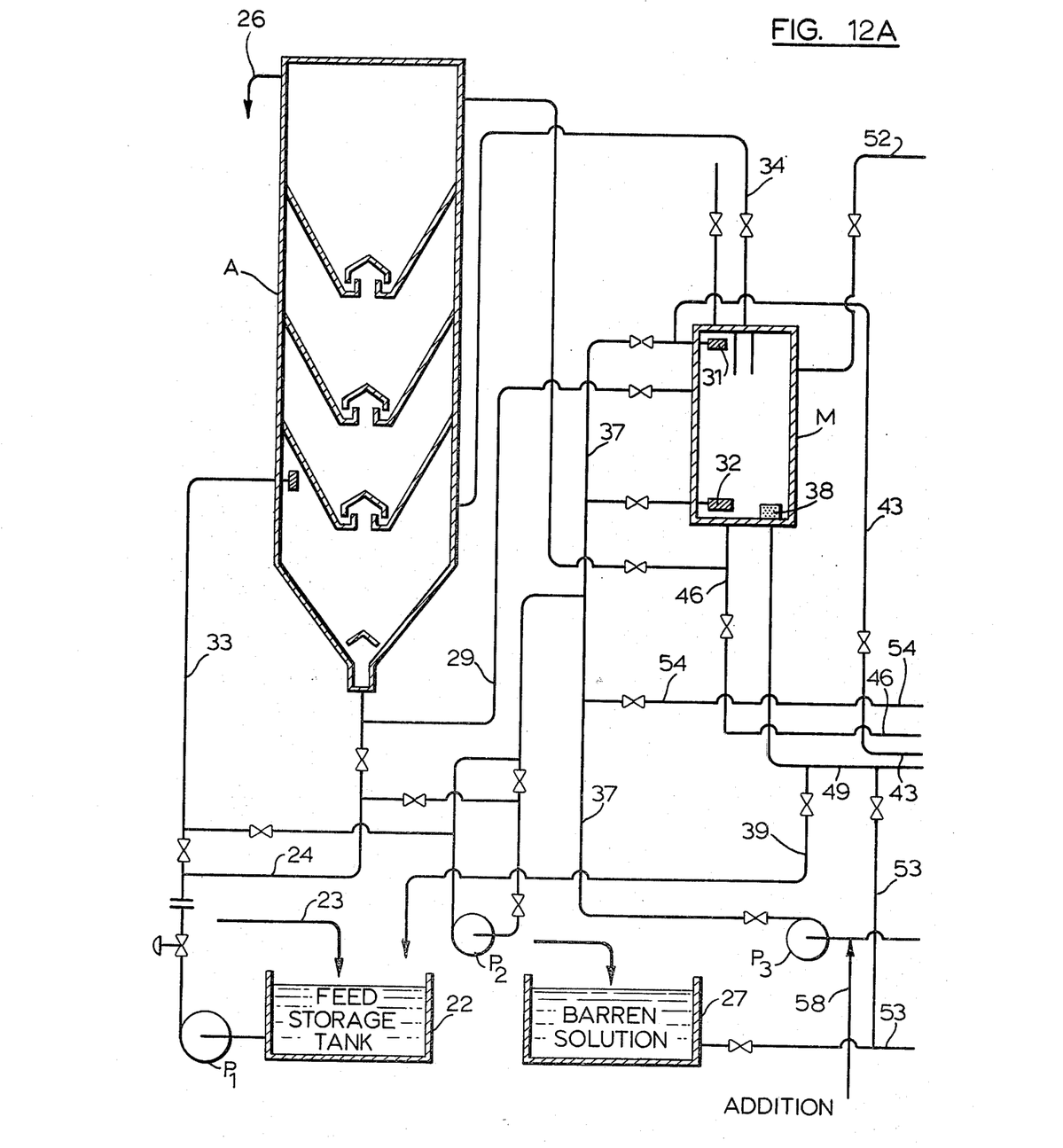
FIG. 12A and 12B together show in greater detail apparatus employed in carrying out the process.
Figure 12B:
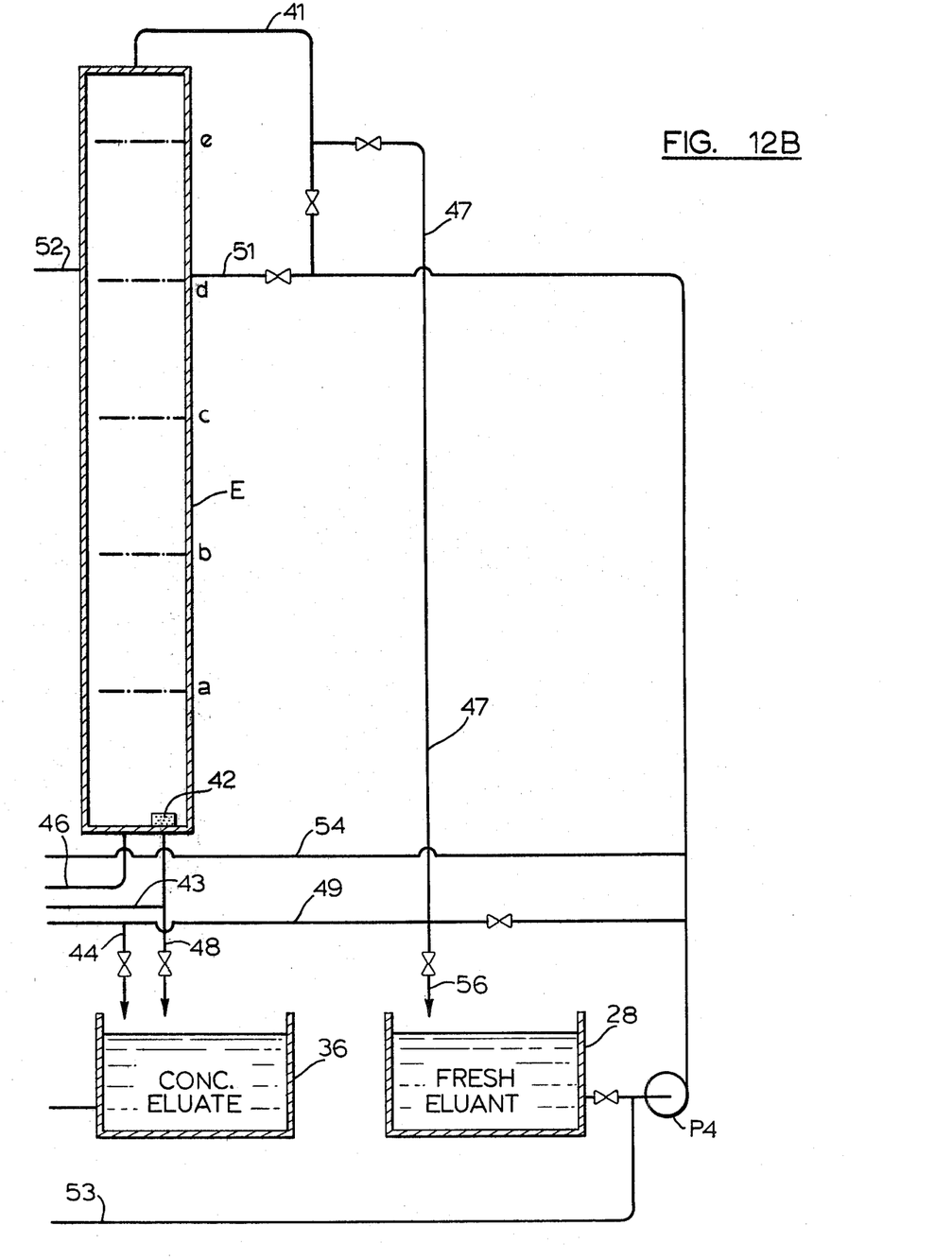

The apparatus as shown in detail in FIGS. 12A and B employs a multiple-compartment continuous downward counter-current resin flow absorption column A of the type described in applicant's U.S. Pat. No. 4,035,292 dated July 12, 1977, and a continuous upward counter-current resin flow elution column E, of the type described in applicant's U.S. Pat. No. 4,018,677 dated Apr. 19, 1977 with a measuring chamber M for use in isolating a predetermined quantity of the resin connected between column A and the elution column E.

As described in U.S. Pat. No. 4,035,292 a flow of pregnant feed at a volumetric flow rate F is passed upwardly through column A at all times to normally retain respective batches of resin particles in each compartment of column A and provision (not shown herein but described in U.S. Pat. No. 4,035,292) is made for transferring batches of resin downwardly from the upper to the lower of any two selected vertically adjacent compartments of column A.

The acid leach liquor is supplied direct to a feed storage tank 22 through a pipe 23. The pregnant feed is withdrawn at rate F from the tank 22 and passed upwardly through the column A by a pump $P_1$ normally through a line 24 connected to the bottom of column A.

Within the column A, uranium and iron in the ferric state are absorbed on the anion-exchange resin particles as complexes, e.g.

$$[UO_2(SO_4)_n]^{2-2n}$$

and $$[Fe(SO_4)_n]^{3-2n}$$

e.g. through the reaction $$2R_2SO_4 + UO_2(SO_4)_3{}^{4-} \rightleftharpoons R_4UO_2(SO_4)_3 + 2SO_4{}^{2-},$$

and similarly for the complexes containing iron.

Barren solution, containing non-absorbed ions including ferric ion and typically containing less than 0.001 g/l uranium calculated as $U_3O_8$, is withdrawn from the top of column A through a pipe 26, and a proportion is returned to a barren solution storage tank 27.

The process proceeds as a cycle of steps, and as a starting point can be taken the conditions prior to the transfer of a batch of loaded particles from the bottom compartment of column A to the measuring chamber M.

At this point, the chamber M is empty of particles and full of pregnant feed liquid. The column E contains vertically adjacent batches of particles in the levels indicated from a up to d in FIG. 12B and is full of eluant liquid. The eluant used in this example is $H_2SO_4$ supplied from a tank 28. The molar concentration of the acid is selected so that it strips the resin efficiently and typically the eluant may be at 1 to 1.5 molar concentration.

Towards the bottom of the column E the eluant contains progressively increasing concentrations of the ion of interest, the bottom of the column containing concentrated eluate.

Figure 1:
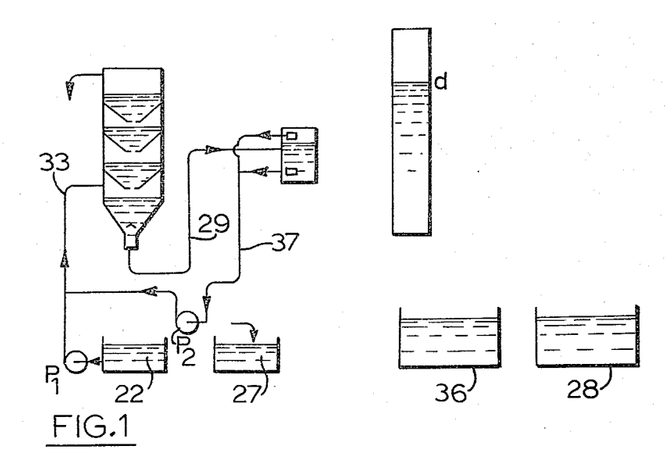
FIGS. 1 to 11 illustrate schematically the successive steps of a recovery process using continuous countercurrent flow of resin.

FIG. 1 Resin Transfer

Loaded resin is transferred from the bottom compartment of column A to chamber M through a pipe 29. This is accomplished by pumping a flow of pregnant liquid in a closed path with a pump $P_2$ at a flow rate of 0.5 F drawn from the chamber M, the flow being withdrawn through strainers 31 and 32 in chamber M, through the pump $P_2$, and a line 33 to the side of the bottom compartment of column A through which the flow F from pump $P_1$ is also temporarily diverted, and through the line 29. This gives a net downward flow of 0.5 F through the bottom compartment, which carries the loaded resin through the line 29 into the chamber M.

Figure 2:
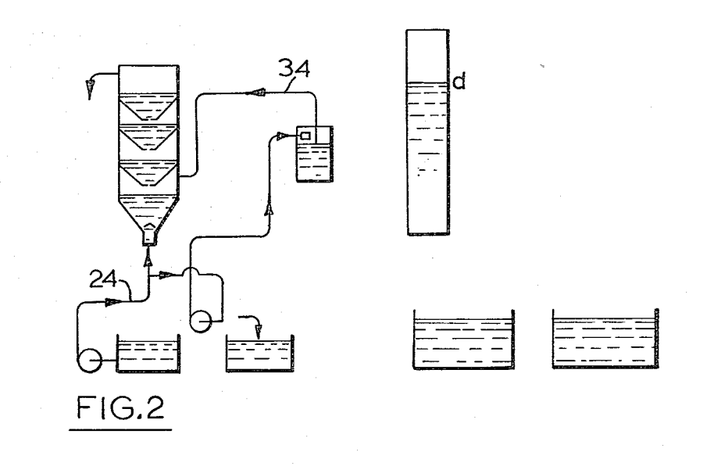

FIG. 2 Resin Measure

When particles no longer flow through line 29, the particles in chamber M are allowed to settle and excess particles are flushed out through a pipe 34 in the top of column M to the bottom compartment of column A, generally as described in U.S. Pat. No. 4,018,677, leaving a predetermined quantity of loaded resin particles in chamber M. Downward transfer of resin within column A can be conducted after this step.

Figure 3:
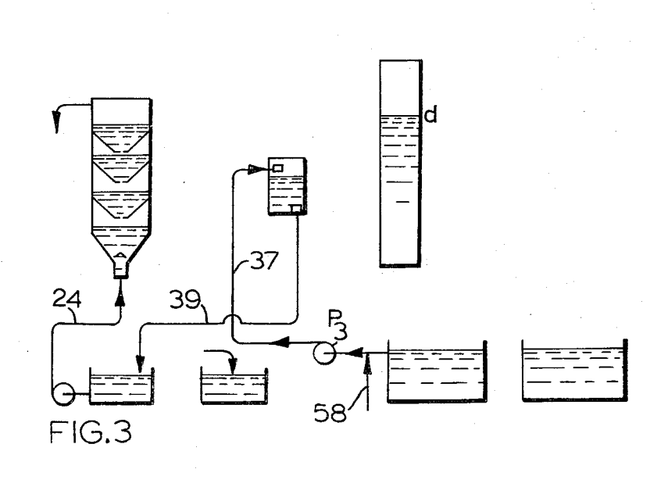

FIG. 3 Condition Loaded Resin

A conditioning liquid is flowed through the quantity of loaded resin in the chamber M. The conditioning liquid may be modified concentrated eluate withdrawn from a concentrated eluate tank 36 by a pump $P_3$ and passed through a line 37 into the top of the chamber M through the strainer 31. The effluent from the chamber M is withdrawn through a strainer 38 at the bottom and passed through a line 39 into the feed storage tank 22. The flow through the chamber M is at such flow rate, which may for example be about 3 bed volumes of the resin in chamber M per hour, as to provide sufficient time for the loaded resin to substantially reach equilibrium with the eluate. Unwanted ion is displaced from the resin in chamber M to the feed storage tank 22, and the flow is continued until a desired quantity of the ion of interest has been added to the feed storage tank 22, to maintain the molar ratio of ion of interest to unwanted ion in the tank 22 to a desired level.

Figure 4:
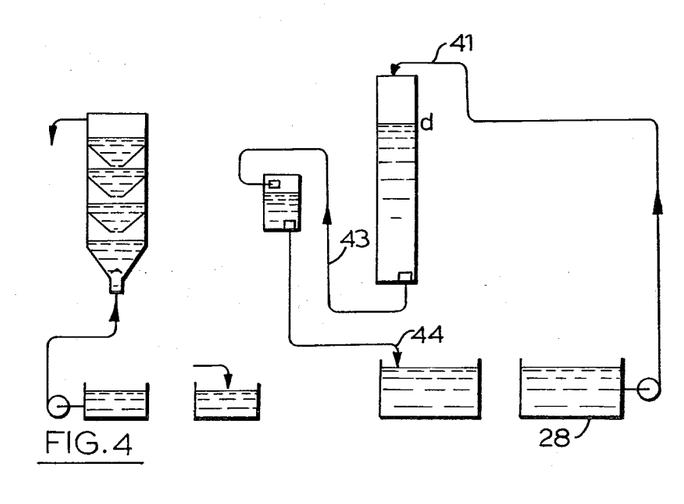

FIG. 4 Elute in Series

The column E and chamber M are eluted in series with a predetermined volume of sulphuric acid withdrawn from the eluant tank 28 by a pump $P_4$ and passed through a line 41 into the top of column E, eluate withdrawn from the bottom of column E through a strainer 42 being passed through a line 43 into chamber M and the concentrated eluate from chamber M being fed into the concentrated eluate tank 36 through a line 44.

The process thereafter follows generally the scheme described in the above-mentioned U.S. Pat. No. 4,018,677.

Figure 5:
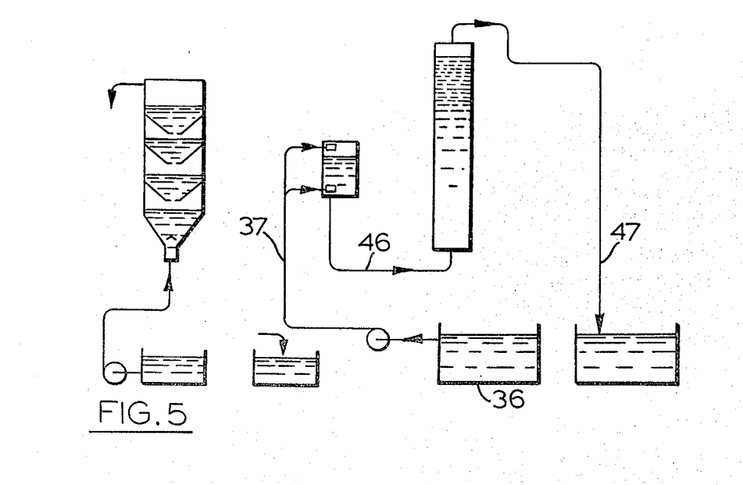

FIG. 5 Resin Transfer

The resin in chamber M is slurried into the bottom of column E with concentrated eluate withdrawn from tank 36 by pump $P_3$ and passed into the chamber M through the strainers 31 and 32. The resin leaves through a pipe 46. After transfer, the presence of the freshly introduced resin in the column E results in the resin level in column E being raised to the level e. In the transfer operation, any fresh eluant that may be displaced from the top of column E passes through a line 47 and is collected in the fresh eluant tank 28.

Figure 6:
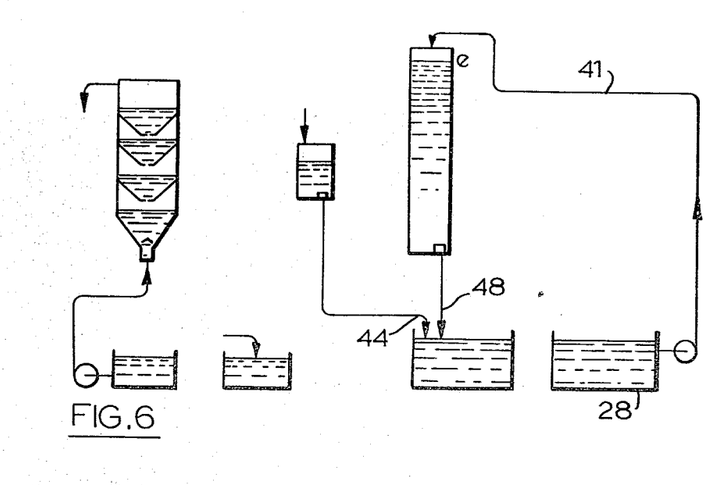

FIG. 6 Drain M and displace carrier liquid

Chamber M is drained down into the concentrated eluate tank through pipe 44, and fresh eluant is pumped into the top of column E with pump $P_4$ through the line 41, in order to displace the concentrated eluate which entered in the previous step. The displaced eluate passes through a line 48 into the tank 36.

Figure 7:
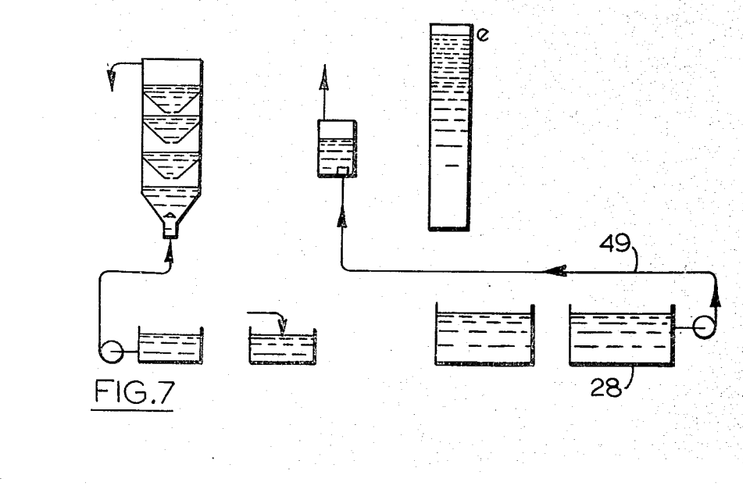

FIG. 7 Fill M with eluant

The air in chamber M is displaced with eluant drawn by pump P4 and passed through a line 49 into the bottom of chamber M through the strainer 38.

Figure 8:
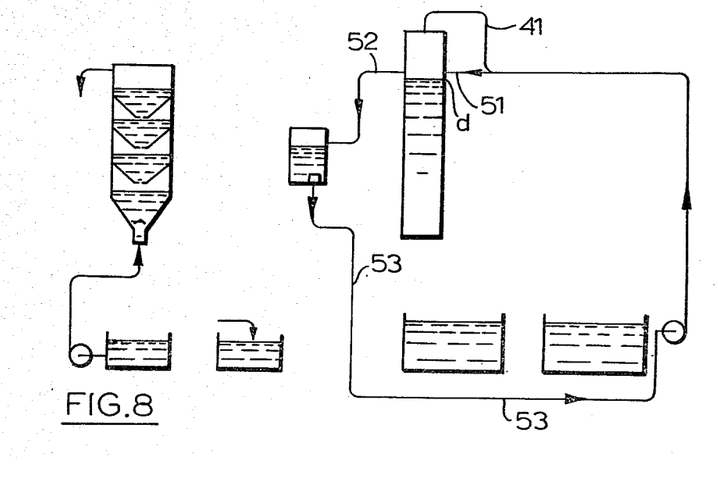

FIG. 8 Resin transfer

Resin is flushed from the top of column E by pumping fresh eluant with pump P4 in a closed cycle through the line 41 and a line 51 into the top of column E, the flushed-out particles entering chamber M through a line 52, and liquid being withdrawn through the strainer 38 and recirculated to the pump P4 through a line 53.

Figure 9:
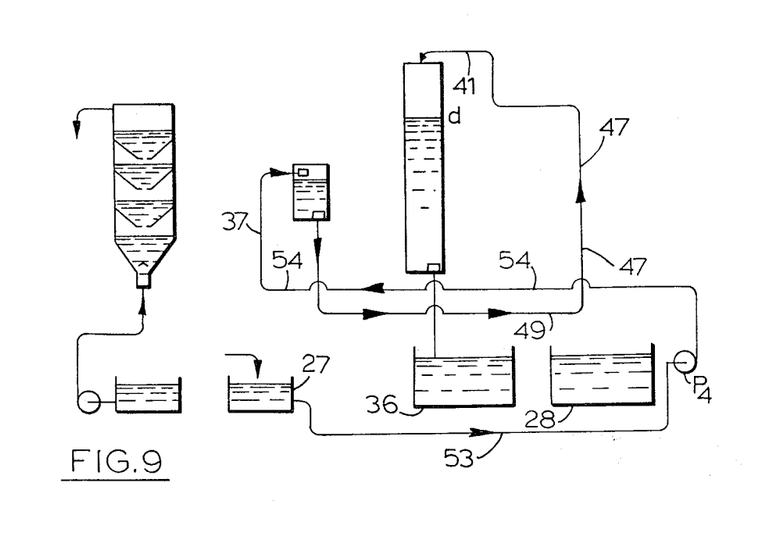

FIG. 9 Displace Eluant in series

When particles no longer flow through line 52, eluant is displaced from the particles in chamber M using barren solution pumped with pump P4 through a line 54 and through the line 37 connected to the upper strainer 31 in chamber M. If the eluant displaced from the chamber M contains too high a concentration of uranium to be returned to the fresh eluant tank 28, the outflow from the strainer 38 in chamber M is passed through the line 49 into the lines 47 and 41 to the top of the elution column E, the concentrated eluate which is displaced from the bottom of column E being passed to the concentrated eluate tank 36 through line 48. Otherwise, the procedure of FIG. 10 is followed.

Figure 10:
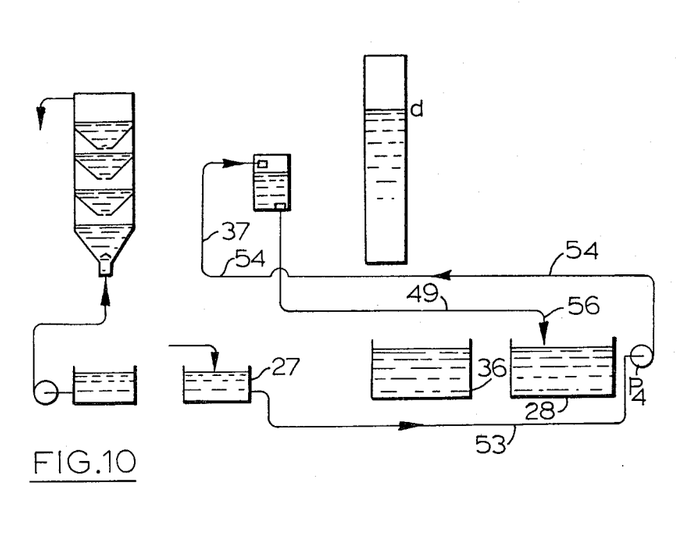

FIG. 10 Displace Eluant

The outflow from strainer 38 of chamber M displaced by the barren solution is passed direct to the fresh eluant tank 28 along the line 49 and a line 56, until the concentration of the outflowing eluant is too dilute for recovery.

Figure 11:
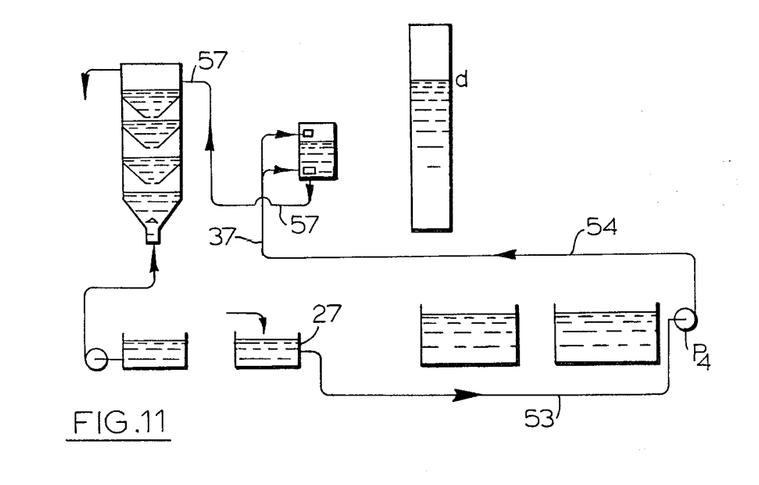

FIG. 11 Resin Transfer

The particles are then slurried out of chamber M with barren solution pumped by pump P4 from the barren solution tank 27 through the lines 54 and 37 to the strainers 31 and 32 in chamber M. The particles slurried out of the chamber pass to the uppermost compartment of the absorption column A through a line 57 extending from the bottom of chamber M.

The cycle of operation can then be repeated.

It will be appreciated that the above-described example is merely illustrative of one sequence of operations that may be employed, and that other forms of process can be used instead. Thus, for example, in the step of draining chamber M and displacing eluate from column E, as illustrated in FIG. 6, the eluate may be displaced from column E either by pumping fresh eluant into the top of the column or by opening an air inlet at the top of the column E and allowing eluate to drain from the column under gravity.

Instead of transferring an eluted batch of resin from the upper part of column E to the intermediate measuring chamber M before returning it to the absorption column A, the batch may instead be transferred direct to the absorption column A. In such case, after draining chamber M and displacing eluate from column E as illustrated in FIG. 6 or as described above, the air in chamber M is displaced with pregnant feed liquor drawn by a line (not shown) connecting the tank 22 to the pump P4 and passed by the pump P4 to the bottom of chamber M through the line 49 and the strainer 38. The transfer of eluted particles from column E to column A is then carried out by flusing the particles from the top of column E by pumping barren solution drawn from tank 27 along line 53 with pump P4, the solution being passed into the top of column E through the lines 41 and 51. The flushed-out particles enter the top of column A through a line (not shown) connecting the outlet line 56 direct to the uppermost compartment of column A. This operation is conducted while the liquid level in column A is low to avoid loss of resin particles, as described in U.S. Pat. No. 4,035,292. When particles no longer flow through the line to the uppermost compartment of column A, the pump P4 is stopped and a gravity flow of barren solution is allowed to continue through the line from chamber E until the flow ceases. The cycle of operations commencing at FIG. 1 can then be repeated.

The step of conditioning the batch of loaded resin that is isolated in chamber M can be carried out at or prior to the stage indicated in FIG. 3.

Some examples applied to uranium extraction are given below:

EXAMPLE 1

A volume of strong base ion exchange resin loaded with uranium and with ferric iron was contacted over a period of 60 mins. with five volumes of 0.3 molar sulphuric acid (pH approx. 0.6). The acid was then displaced over a period of 10 mins. with one volume of concentrated eluate containing 16.5 g/l. U adjusted with sulphuric acid at approx. pH 0.6.

The results were indicated in Table 1

TABLE 1

|  | Resin before Conditioning | Resin after Conditioning | % Change |
|---|---|---|---|
| Uranium (U) | 59.6 g/l. | 60.4 g/l. | +1.34 |
| Iron ($Fe^{3+}$) | 9.9 g/l. | 2.88 g/l. | −70.9 |
| $Fe^{3+}$ as % of U | 16.6% | 4.7% | −71.7 |

EXAMPLE 2

A volume of strong base ion exchange resin loaded with uranium and with ferric iron was contacted over a period of 39 mins. with 3.6 volumes of an aqueous solution containing 44.3 g/l. U and adjusted to approx. pH 1 with $H_2SO_4$.

The results were indicated in Table 2

TABLE 2

|  | Resin before Conditioning | Resin after Conditioning | % Change |
|---|---|---|---|
| U | 70.6 g/l. | 130 g/l. | +84% |
| $Fe^{3+}$ | 4.22 | 0.98 | −77% |
| $Fe^{3+}$ as % of U | 5.98% | 0.75% | −87.5 |

In the procedures of both Example 1 and Example 2 it was noted that the majority of the iron came off the resin while the first two volumes of conditioning solution were being passed through the loaded resin.

The results obtained in Example 2 indicate that a commercially pure yellow cake could be precipitated directly from the eluate of the resin without the need for further purification.

The uranium loadings that are obtained are strikingly high and may indicate that the uranium is being loaded as a divalent complex rather than as the tetravalent complex form which uranium is normally assumed to adopt.

The above Examples have referred to treatments in which a conditioning liquid is employed of pH lower than the eluate.

In alternative procedures, conditioning liquids of increased pH may be employed.

EXAMPLE 3

Employing a recovery process generally as described with reference to the drawings, the pH of concentrated eluate recovered in the concentrated eluate tank 36, normally about pH 0.7, can be adjusted to a pH in the range of about pH 1 to 3, more typically about pH 1.5 to 2.5, to provide an activated eluate, by addition of a base, e.g. ammonia, or sodium or magnesium hydroxide, or calcium hydroxide if precipitated solids are removed, through the addition line 58, as indicated in FIG. 3 prior to flowing the concentrated eluate through the loaded resin in the measuring chamber M.

In the resin saturation step of FIG. 3, unwanted $Fe^{3+}$ ion is eluted to the pregnant feed tank 22. However, as the effluent from the chamber M is rich in uranium, the flow can be continued until such time as the flow adds to the tank 22 sufficient uranium to diminish the $Fe^{3+}/U$ ratio to a level, as low as practical and preferably below about 12:1, at which the disadvantages associated with initial saturation of the resin with $Fe^{3+}$ complexes are avoided, or significantly reduced.

In this way, greatly reduced initial loadings of $Fe^{3+}$ can be obtained on the loaded resin passed to the chamber M, and these relatively low loadings of $Fe^{3+}$ can be almost entirely displaced from the loaded resin in the saturation step of FIG. 3 prior to recovering concentrated eluate from the loaded resin to the concentrated eluate tank, thus achieving an eluate which is substantially free of $Fe^{3+}$ ion.

Table 3 shows compositions of streams that may be achievable with this process.

TABLE 3

| Stream | Uranium gm. $U_3O_8/l$ | $Fe^{3+}$ gm/l | $SO_4^{2-}$ gm/l | Molar Ratio $Fe^{3+}/U$ | Weight Ratio $SO_4^{2-}/U_3O_8$ |
|---|---|---|---|---|---|
| Feed (through line 23) | 1.00 | 6.00 | 40.00 | 30:1 | 40:1 |
| Modified feed contents of 22) | 1.518 | 6.071 | 41.08 | 20:1 | 27:1 |
| Eluate (contents of 36) | 45.83 | <0.4 | 84.00 | 0.044:1 | 1.8:1 |

In one example of the practice of the process, with stream compositions as in Table 3, when NaOH is used as the addition 58 to raise the pH of the eluate to pH 2, about 10.11 g of $H_2SO_4$ would be consumed per gram of $U_3O_8$ recovered and about 0.97 g of NaOH would be added per gram of recovered $U_3O_8$.

EXAMPLE 4

A sample of IRA 400 anion exchange resin in the sulphate form was placed in a column and a pregnant feed solution in the form of a sulphatic feed solution at pH 2.2 containing uranium and ferric ion at a molar ratio of $Fe^{3+}/U$ of 10:1 was flowed through the column until the resin was in equilibrium with the feed solution. The loading achieved on the resin was 83 g/l $U_3O_8$.

Thereafter, the loaded resin was treated with a conditioning solution rich in uranium ion. The conditioning solution was obtained by dissolving yellow cake from a conventional uranium recovery plant in sulphuric acid and was adjusted to pH 1.5 by addition of sodium hydroxide.

The conditioning solution contained 22 g/l $U_3O_8$, and a volume of the conditioning solution equal to three bed volumes of the loaded resin was flowed through the loaded resin over a period of twenty minutes.

After the treatment, the resin loadings were analysed and were found to be 130 g $U_3O_8/l$ bed volume of the resin and 0.7 g $Fe^{3+}/l$ bed volume.

In the step of eluting this loaded resin with 1 M $H_2SO_4$, the first bed volume of eluate contained 26 g/liter $U_3O_8$ and 0.7 g/liter $Fe^{3+}$. Substantially the whole of the $Fe^{3+}$ was stripped from the resin in the first bed volume of eluate.

In counter current elution of the loaded resin, six batches of the loaded resin could be substantially completely stripped with about 12 to 15 bed volumes of 1 M $H_2SO_4$, i.e. one bed volume of the resin could be stripped with about 2 to 2½ bed volumes of the acid.

The resulting strong eluate accordingly has a concentration of $U_3O_8$ of approximately 50 to 65 g $U_3O_8/l$ and a ferric ion concentration of less than 0.4 g/l.

Instead of using adjustment of the pH of the concentrated eluate to produce a conditioning solution a similar result may be achievable by dissolving in the eluate additional uranium recycled from the recovery processing conducted on the strong eluate.

Further, examples of conditioning liquids include solutions derived from the subsequent uranium recovery operations which need not have uranium contents as high as are encountered in the concentrated eluate.

Moreover, the conditioning solution may instead be a uranium rich solution at such oxidation-reduction potential, achieved by dosing with a reducing agent such as metallic iron particles or sulphur dioxide, that the $Fe^{3+}$ is reduced to the $Fe^{2+}$ state, which is incapable of forming complexes for which the resin has affinity.

EXAMPLE 5

An increased initial loading of uranium onto the resin can be achieved by recycling concentrated eluate to the pregnant feed storage tank in an amount sufficient to significantly diminish the $Fe^{3+}/U$ ratio present in the feed supplied through the inlet line 23. For this purpose, only small quantities of concentrated eluate need to be recycled, relative to the flow of pregnant feed liquor.

Table 4 shows the stream compositions that may be achievable, where the process described above with reference to the drawings was conducted with the omission of the resin conditioning step of FIG. 3, and with a small volume of concentrated eluate being pumped directly from the eluate tank 36 to the feed storage tank 22 for each unit volume of acid leach liquor added through the line 23.

TABLE 4

| Stream | Uranium gm. $U_3O_8/l$ | $Fe^{3+}$ gm./l | $SO_4^{2-}$ gm./l | Molar Ratio $Fe^{3+}/U$ | Weight Ratio $SO_4^{2-}/U_3O_8$ |
|---|---|---|---|---|---|
| Feed (through line 23) | 1.00 | 6.00 | 40.00 | 30:1 | 40:1 |
| Modified (contents of 22) | 1.495 | 5.982 | 40.67 | 20:1 | 27:1 |

TABLE 4-continued

| Stream | Uranium gm. $U_3O_8$/l | $Fe^{3+}$ gm./l | $SO_4^{2-}$ gm./l | Molar Ratio $Fe^{3+}$/U | Weight Ratio $SO_4^{2-}/U_3O_8$ |
|---|---|---|---|---|---|
| Eluate (contents of 36) | 28.33 | 5.00 | 77.00 | 0.88:1 | 2.7:1 |

While the above-described process has referred to separation of uranium from uranium and ferric ion-containing liquors, it will be appreciated that the same processing steps may be applied with other feed solutions e.g. solutions containing copper as the ion of interest, and with feed solutions containing ferric ion and other unwanted components that may load on the resin.

Moreover, the principles of pre-treatment of the loaded resin to reduce unwanted ion loadings and of enriching the feed solution to obtain higher initial loadings are not restricted in their application to anion-exchange processes but may be applied in cation-exchange processes.

I claim:

1. A process for recovery or uranium in relatively concentrated form from a feed solution relatively weak in uranium ions and containing ferric ions as an unwanted component, comprising passing batches of anion exchange resin particles having preferential affinity for uranium complex anions successively along an absorption column; contacting said batches in the column with said feed solution and permitting uranium ions, together with ferric ions, to load onto the particles as complex anions and withdrawing from the absorption column a barren solution substantially exhausted of uranium ions and containing non-absorbed ferric ions; removing uniform batches of the loaded particles from the absorption column; isolating each of said uniform batches of loaded resin particles removed from the absorption column in a conditioning chamber; conditioning each isolated batch by flowing through it at a controlled rate a conditioning solution that is rich in uranium ions and weak in ferric ions and is at a pH effective to increase the ratio between the uranium ions and the ferric ions loaded on the resin particles by causing ion exchange to occur between the conditioning solution and the resin whereby further uranium ions are loaded onto the resin and some of the ferric ions are removed from the resin and concomitantly withdrawing from the conditioning chamber a spent conditioning solution containing uranium ions and ferric ions; recycling the spent conditioning solution to said feed solution; moving the conditioned batches to an elution column and passing them successively along the elution column; contacting the conditioned batches in the column with sulphuric acid eluant solution that strips the uranium ion and ferric ion from the resin particles; recovering from the elution column a concentrated eluate that is a relatively concentrated uranium solution at acidic pH, and contains a relatively low concentration of ferric ions; subjecting the concentrated eluate to uranium-recovery treatment, and recovering a uranium-rich yellow cake therefrom; and wherein said conditioning solution is a liquid selected from the group consisting of a portion of the concentrated eluate recovered from the elution column that is modified by increasing its pH by addition of a base thereto, and a solution comprising a portion of said yellow cake dissolved in sulphuric acid.

2. A process as claimed in claim 1 wherein said conditioning liquid is a portion of the concentrated eluate recovered from the elution column that is modified by addition of a base thereto.

3. A process as claimed in claim 2 wherein said concentrated eluate is modified by addition of calcium hydroxide thereto, and removing the precipitated solids that are thereby obtained.

4. A process as claimed in claim 1, 2, or 3 wherein the anion exchange resin is a strong base anion exchange resin.

5. A process as claimed in claim 1, 2, or 3 in which the feed solution and the eluant solution are flowed countercurrent to the movement of the resin particles through the absorption column and the elution column, respectively.

6. A process according to claim 1 in which the conditioning solution flowed through the loaded resin is of substantially uniform composition and the solution is contacted with the loaded resin for a predetermined period until equilibrium is substantially completely achieved in said ion exchange between the conditioning solution and the resin.

* * * * *